United States Patent
Yano et al.

(10) Patent No.: US 8,229,107 B2
(45) Date of Patent: Jul. 24, 2012

(54) ECHO CANCELER

(75) Inventors: Atsuyoshi Yano, Tokyo (JP); Ikuo Kajiyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 976 days.

(21) Appl. No.: 12/085,326

(22) PCT Filed: Jan. 17, 2006

(86) PCT No.: PCT/JP2006/300530
§ 371 (c)(1),
(2), (4) Date: May 21, 2008

(87) PCT Pub. No.: WO2007/083349
PCT Pub. Date: Jul. 26, 2007

(65) Prior Publication Data
US 2009/0168993 A1  Jul. 2, 2009

(51) Int. Cl.
*H04M 9/08* (2006.01)
(52) U.S. Cl. .............. 379/406.04; 379/406.07
(58) Field of Classification Search ............. 379/406.04, 379/406.07
See application file for complete search history.

(56) References Cited

U.S. PATENT DOCUMENTS

| | | | |
|---|---|---|---|
| 4,645,883 A | | 2/1987 | Horna et al. |
| 5,274,705 A | * | 12/1993 | Younce et al. ........... 379/406.05 |
| 5,745,564 A | * | 4/1998 | Meek ....................... 379/406.08 |
| 5,764,753 A | | 6/1998 | McCaslin et al. |
| 2003/0043999 A1 | | 3/2003 | Farrell et al. |
| 2004/0037419 A1 | | 2/2004 | Zhang et al. |

FOREIGN PATENT DOCUMENTS

| | | |
|---|---|---|
| JP | 2573234 B2 | 10/1996 |
| JP | 10-23172 A | 1/1998 |
| JP | 3386327 B2 | 1/2003 |
| JP | 2003-134005 A | 5/2003 |

\* cited by examiner

*Primary Examiner* — Alexander Jamal
(74) *Attorney, Agent, or Firm* — Birch, Stewart, Kolasch & Birch, LLP (57) ABSTRACT

A state deciding unit 2 makes a decision of double talk when both received signal and transmission signal are in a speech burst, and when the amount of reduction in an echo removal level per prescribed time period exceeds a predetermined threshold, the echo removal level being represented as a level difference between the transmission signal and a residual signal passing through the echo elimination by an adaptive filter 1, and when the amount of changes of the signal level of the received signal is less than a prescribed reference value.

6 Claims, 5 Drawing Sheets

ECHO CANCELER

TECHNICAL FIELD

The present invention relates to an echo canceler for canceling echo in hands-free talking equipment and the like, for example.

BACKGROUND ART

Generally, an echo canceler in the hands-free talking equipment is constructed using an adaptive filter and an echo suppressor. The echo suppressor, which is used for suppressing residual echo leftover after elimination with the adaptive filter, is realized by a center clipper or a variable attenuator.

Among them, as for the center clipper, since the amplitude level of its removable residual echo is restricted to certain limits, it cannot be applied to the case where the amplitude level of the residual echo is large. On the other hand, as for the variable attenuator, although it is applicable to the case where the amplitude level of the residual echo is large, it is necessary for using the variable attenuator to provide double talk decision processing for preventing a partial loss of transmission voice, and to control the amount of loss of the variable attenuator in such a manner that the transmission signal is attenuated only in a single talk state of a receiving side.

As an example of such a double talk decision method, there is a method described in Patent Document 1, for example. The decision method described in the document obtains the average value of the level differences between the received signal and the transmission signal in a state in which the received signal is in a speech burst condition; makes the average value an estimated echo gain, and obtains the estimated echo level from the estimated echo gain and the received signal level; and makes a decision that the receiving side is in the single talk if the transmission signal or the residual signal level of the adaptive filter is equivalent to or less than the estimated echo level, and in the double talk if it is greater than that.
Patent Document 1: Japanese Patent No. 3386327.

However, in conditions in which the echo level exceeds the transmission voice level averagely, the level of the transmission signal or of the residual signal becomes equal to or less than the estimated echo level regardless of whether the single talk or double talk at the receiving side, and the decision result always becomes the single talk at the receiving side. This offers a problem of hindering the accurate detection of the double talk.

Such conditions can occur in the case where in positional relationships between a talker, a microphone and a speaker, the distance between the talker and the microphone is not short enough compared with the distance between the microphone and the speaker, or the sound pressure level of received voice reproduced from the speaker is much higher than the sound pressure level of the transmission voice.

The present invention is implemented to solve the foregoing problem. Therefore it is an object of the present invention to provide an echo canceler capable of detecting double talk sections precisely and carrying out echo suppression processing even in conditions in which the echo level exceeds the transmission voice level averagely.

DISCLOSURE OF THE INVENTION

The echo canceler in accordance with the present invention is configured in such a manner as to make a decision of double talk when both received signal and transmission signal are in a speech burst, and when the amount of reduction of a difference between the transmission signal and a residual signal passing through echo elimination by an adaptive filter per prescribed time period exceeds a predetermined threshold, and when the amount of changes of the received signal is less than a prescribed reference value.

This makes it possible to implement the echo canceler capable of carrying out the echo suppression processing by detecting the double talk section precisely even in conditions where the echo level exceeds the transmission voice level averagely.

BEST MODE FOR CARRYING OUT THE INVENTION

The best mode for carrying out the invention will now be described with reference to the accompanying drawings to explain the present invention in more detail.

Embodiment 1

Figure 1:
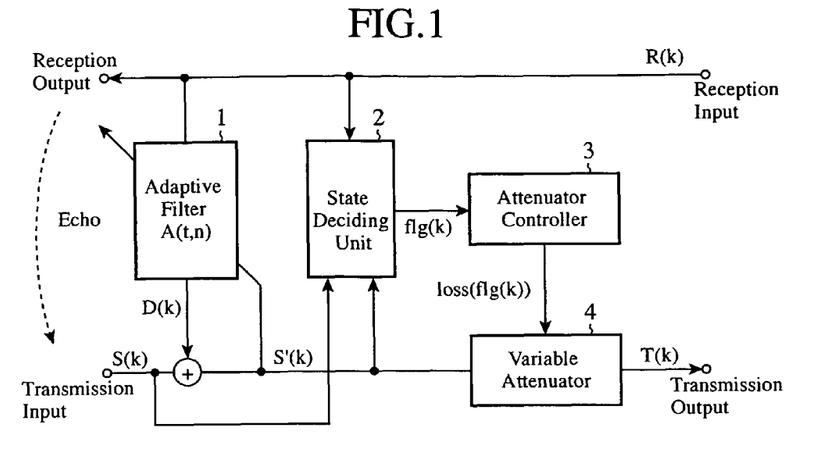
FIG. 1 is a block diagram showing a configuration of the echo canceler of an embodiment 1 in accordance with the present invention.

FIG. 1 is a block diagram showing a configuration of the echo canceler of an embodiment 1 in accordance with the present invention.

The echo canceler shown in FIG. 1 has an adaptive filter 1, a state deciding unit 2, an attenuator controller 3, and a variable attenuator 4.

The adaptive filter 1 is a well-known adaptive filter that generates a dummy echo signal from a received signal, and carries out echo elimination by subtracting the dummy echo signal from the transmission signal. The state deciding unit 2 is a decision unit that decides a communication state such as single talk and double talk at the receiving side or transmitting side on the basis of the received signal, the transmission signal and the residual signal passing through the echo elimination by the adaptive filter 1. The details of the state deciding unit 2 will be described later.

The attenuator controller 3 is a controller that controls the variable attenuator 4 on the basis of the decision result of the state deciding unit 2. In addition, the variable attenuator 4 is an attenuator controlled by the attenuator controller 3 for adding an arbitrary loss to the transmission signal level.

Figure 2:
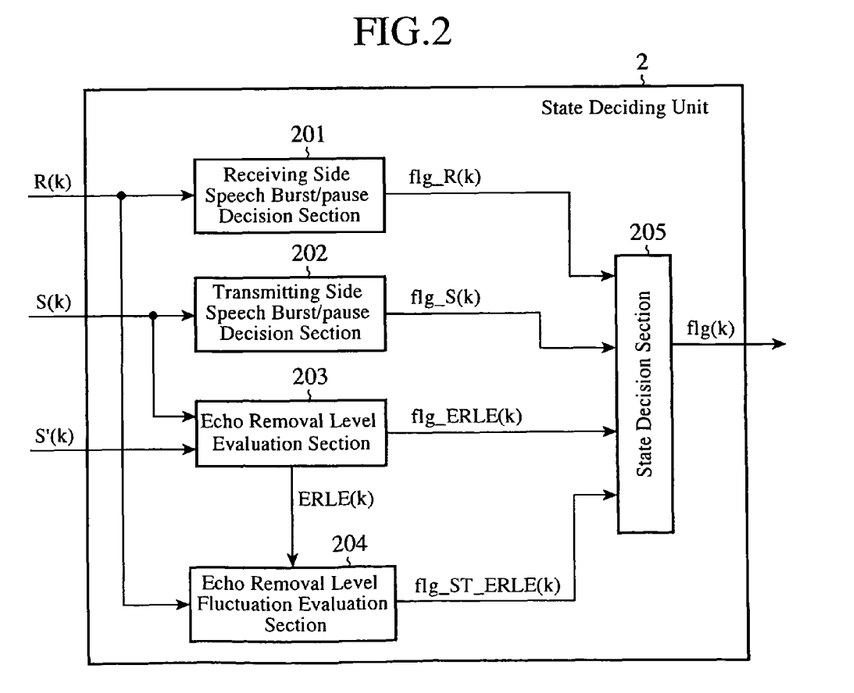
FIG. 2 is a block diagram showing a detailed configuration of the state deciding unit in the echo canceler of the embodiment 1 in accordance with the present invention.

FIG. 2 is a block diagram showing a detailed configuration of the state deciding unit 2.

The state deciding unit 2 includes a receiving side speech burst/pause decision section 201, a transmitting side speech burst/pause decision section 202, an echo removal level evaluation section 203, an echo removal level fluctuation evaluation section 204, and a state decision section 205.

The receiving side speech burst/pause decision section 201 is a functional block for deciding the presence or absence of the signal on the receiving side on the basis of the received signal R(k). The transmitting side speech burst/pause decision section 202 is a functional block for deciding the presence or absence of the signal on the transmitting side on the basis of the transmission signal S(k). The echo removal level evaluation section 203 is a functional block for deciding the echo removal level on the basis of the transmission signal S(k) and a residual signal S'(k). The echo removal level fluctuation evaluation section 204 is a functional block for deciding fluctuations in the echo removal level on the basis of the received signal R(k) and an output ERLE(k) of the echo removal level evaluation section 203. The state decision section 205 is a functional block for making a decision from the decision results of the receiving side speech burst/pause decision section 201—echo removal level fluctuation evaluation section 204 as to the communication state, that is, as to whether both the transmitting side and receiving side are in a speech pause, or the transmitting side single talk, or the receiving side single talk, or the double talk.

Next, the operation of the echo canceler with the foregoing configuration will be described.

The echo canceler is supplied with inputs of the received signal R(k) and the transmission signal S(k). Here, k is time in digital expression, and is counted up one by one from the start point of the operation of the echo canceler at the same period as the sampling period of the signal.

The adaptive filter 1 generates a dummy echo signal D(k) from the input received signal R(k), carries out the echo elimination by subtracting D(k) from the transmission signal S(k), and outputs the residual signal S'(k). The state deciding unit 2 makes a decision from R(k), S(k) and S'(k) as to whether the telephone conversation state is in the speech pause of both the transmitting and receiving sides, in the single talk of the transmitting side, in the single talk of the receiving side or in the double talk, and outputs a state decision flag flg(k).

The attenuator controller 3 decides from flg(k) the amount of loss to be added to the transmitting side, and outputs the loss amount loss(k). The variable attenuator 4 adds to S'(k) the loss corresponding to the loss(k), and outputs a transmission output signal T(k).

The state deciding unit 2 makes the decision as to the communication state as follows.

The receiving side speech burst/pause decision section 201 receives R(k), and calculates a short time average signal level LR(k) of R(k).

$$LR(k) = 10\log_{10}\left\{\frac{1}{L}\sum_{m=k-L+1}^{k} R(m)^2\right\} \quad (1)$$

where L is a constant and is a time block for obtaining the short time average. The receiving side speech burst/pause decision section 201 makes a decision as to the speech burst/speech pause state at the receiving side depending on whether LR(k) exceeds a prescribed receiving side speech burst/pause decision threshold THR_R or not, and outputs a decision result flg_R(k). Thus, it outputs the speech burst decision flg_R(k)=1 if LR(k) exceeds THR_R, but outputs the speech pause decision flg_R(k)=0 if LR(k) is less than THR_R.

Likewise, the transmitting side speech burst/pause decision section 202 receives S(k), and calculates a short time average signal level LS(k) of S(k).

$$LS(k) = 10\log_{10}\left\{\frac{1}{L}\sum_{m=k-L+1}^{k} S(m)^2\right\} \quad (2)$$

Furthermore, the transmitting side speech burst/pause decision section 202 makes a decision as to the speech burst/speech pause state at the transmitting side depending on whether LS(k) exceeds a prescribed transmitting side speech burst/pause decision threshold THR_S, and outputs a decision result flg_S(k). Thus, it outputs the speech burst decision flg_S(k)=1 if LS(k) exceeds THR_S, but outputs the speech pause decision flg_S(k)=0 if LS(k) is less than THR_S.

The echo removal level evaluation section 203 receives S(k) and S'(k), and calculates the apparent echo removal level ERLE(k) through the adaptive filter 1 first from the level difference between S(k) and S'(k) according to the following expression.

$$ERLE(k) = 10\log_{10}\left\{\frac{1}{L}\sum_{m=k-L+1}^{k} S^2(m)\right\} - 10\log_{10}\left\{\frac{1}{L}\sum_{m=k-L+1}^{k} S'^2(m)\right\} \quad (3)$$

Thus, the echo removal level ERLE(k) is expressed by the level difference between the transmission signal S(k) and the residual signal S'(k) resulting from the echo elimination through the adaptive filter 1.

The echo removal level evaluation section 203 further outputs an evaluation result flg_ERLE(k)=0 indicating a state of low echo removal level if ERLE(k) is less than a prescribed threshold THR_ERLE. In contrast, if ERLE(k) is higher than the threshold, it outputs the evaluation result flg_ERLE(k)=1 indicating a state of high echo removal level. In this case, the threshold THR_ERLE is set at a sufficiently low value to prevent erroneous detection of the double talk owing to slight reduction of ERLE(k) due to disturbance.

In addition, the echo removal level evaluation section 203 outputs the calculated ERLE(k) to the echo removal level fluctuation evaluation section 204.

The echo removal level fluctuation evaluation section 204 calculates the fluctuation amount ERLE_DEF(k) of ERLE(k) according to the following expression.

$$ERLE\_DEF(k) = \frac{1}{L}\{ERLE(k) - ERLE(k-L)\} \quad (4)$$

The degree of the fluctuations in the echo removal level is evaluated according to the threshold decision as to ERLE_DEF(k). Here, although ERLE_DEF(k) naturally reduces as the signal level LR(t) of the received signal which is normally an echo source reduces, since the reduction in the echo removal level in this case has nothing to do with the double talk, it is excluded as an exception. Accordingly, the echo removal level fluctuation evaluation section 204 refers not only to ERLE_DEF(k), but to the fluctuation amount LR_DEF(k) of LR(k) at the evaluation of the fluctuations. The fluctuation amount LR_DEF(k) is calculated according to the following expression.

$$\text{LR\_DEF}(k) = \frac{1}{L}\{LR(k) - LR(k-L)\} \quad (5)$$

The echo removal level fluctuation evaluation section 204 outputs, if $$ERLE\_DEF(k) \leq THR\_ERLE\_DEF$$

$$|LR\_DEF(k)| \leq THR\_LR\_DEF \quad (6)$$

hold, the decision result flg_ST_ERLE(k)=0 indicating the state in which the echo removal level fluctuates sharply. Otherwise, it outputs the decision result flg_ST_ERLE(k)=1 indicating the state in which the echo removal level is stable.

Alternatively, the fluctuations can be evaluated by comparing ERLE_DEF(k) with LR_DEF(k). For example, when $$ERLE\_DEF(k) - LR\_DEF(k) \leq THR\_ERLE\_LR \quad (7)$$

holds, flg_ST_ERLE(k)=1 can be output, otherwise flg_ST_ERLE(k)=0 can be output. In addition, the fluctuations can be evaluated on whether ERLE_DEF(k)/LR_DEF(k) is greater than a prescribed reference value or not rather than on the difference between ERLE_DEF(k) and LR_DEF(k).

Next, the state deciding operation in the state decision section 205 will be described.

The state decision section 205 refers to the speech burst/pause decision results on both the transmitting and receiving sides, first. If both of them are in a speech pause, that is, if flg_S(k)=0 and flg_R(k)=0, it outputs the state decision result flg(k)=0 indicating the speech pause.

If flg_S(k)=1 and flg_R(k)=0, the state decision section 205 outputs the decision result flg(k)=1 indicating the single talk of the transmitting side, and if flg_S(k)=0 and flg_R(k)=1, it outputs the decision result flg(k)=2 indicating the single talk of the receiving side.

In the case where flg_S(k)=1 and flg_R(k)=1, if flg_ERLE(k)=1 and if flg_ST_ERLE(k)=1 holds continuously from k=k0 to k=k1, where k1 is the present time and k0 is time satisfying k0=k1−C (C>0), the state decision section 205 outputs flg(k)=2 (receiving side single talk). Here, C is a constant representing a prescribed time length.

In contrast, even in the case where flg_S(k)=1 and flg_R(k)=1, if flg_ERLE(k)=0 or if it becomes flg_ST_ERLE(k)=0 even only for an instant from k=k0 to k=k1, the state decision section 205 outputs flg(k)=3 (double talk).

Incidentally, to prevent the attenuator insertion amount from becoming unstable because of incessant fluctuations in the decision result of the state deciding unit due to disturbance, it is also allowed to provide the state decision with hangover time, and unless the same decision result continues for a prescribed time period, the previous decision result can be output successively.

The attenuator controller 3 receives the state decision result flg(k), and outputs, in response to flg(k), the loss amount, loss{flg(k)}{flg(k)=0, 1, 2, 3}, which is necessary for the transmitting circuit.

Here, although the value loss{flg(k)} is assumed to be determined freely in advance, it becomes as follows in general.

loss(0)=loss(1)=$A$ [dB]

loss(2)=$B$[dB]

loss(3)=$C$[dB]

where A$\leq$C$\leq$B.

The variable attenuator 4 receives the loss(flg(k)), attenuates S'(k) by the amount of the loss(flg(k)) [dB], and outputs the transmission output signal T(k).

Figure 3:
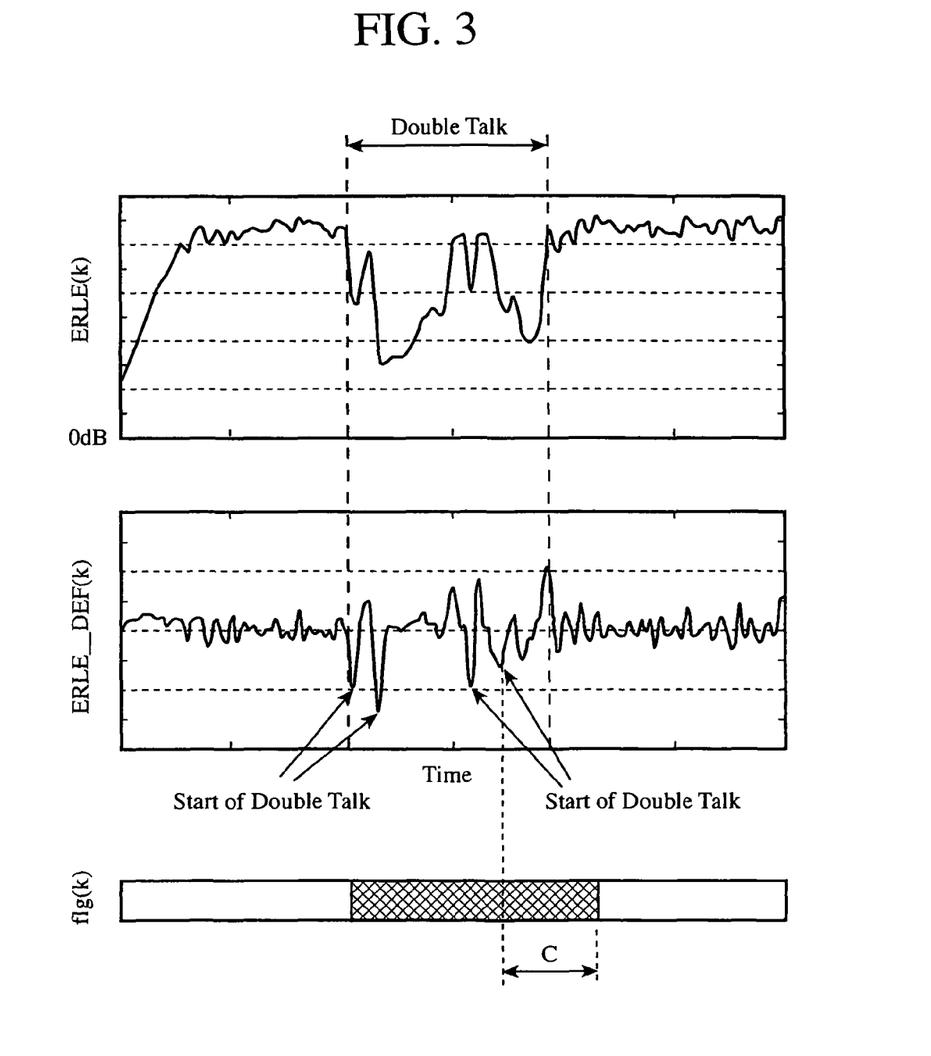
FIG. 3 is a diagram illustrating the state deciding operation in the echo canceler of the embodiment 1 in accordance with the present invention.

FIG. 3 illustrates, in conditions where the echo level averagely exceeds the transmission voice level, the variations of ERLE(k) and ERLE_DEF(k) when the state changes from the receiving side single talk to the double talk, and the output results of flg(k) in the embodiment.

In FIG. 3, at the instant the double talk occurs, ERLE(k) reduces sharply. This is because the level difference between the transmission signal S(k) and the residual signal S'(k) narrows instantaneously because of the transmission voice left in the residual signal. If the double talk decision is made only on the basis of ERLE(k), however, the decision threshold for ERLE(k) must be set at a higher value in such conditions as illustrated in FIG. 3, which is likely to always lead to make the double talk decision when ERLE(k) becomes small due to the effect of ambient noise, for example.

However, the present embodiment detects, in addition to the speech burst and speech pause information about the transmission and reception, a negative peak of ERLE_DEF(k) at the instant the double talk occurs using a threshold, and makes the double talk decision, thereby making a precise double talk decision as in the decision example of flg(k) of FIG. 3. Here, in flg(k), the shaded portion indicates flg(k)=3 (double talk), and the remaining portions indicate flg(k)=2 (receiving side single talk).

As described above, the echo canceler of the embodiment 1 includes: an adaptive filter for carrying out echo elimination by generating a dummy echo signal from a received signal and by subtracting the dummy echo signal from a transmission signal; a state deciding unit for making a double talk decision when the received signal and the transmission signal are in a speech burst, when an amount of reduction in an echo removal level per prescribed time period exceeds a predetermined threshold, the echo removal level being represented as a level difference between the transmission signal and a residual signal passing through the echo elimination by the adaptive filter, and when an amount of changes of a signal level of the received signal is less than a prescribed reference value; a variable attenuator for adding a loss to the residual signal; and an attenuator controller for controlling an amount of loss of the variable attenuator in accordance with a decision result of the state deciding unit. Thus, it can detect the occurrence of the double talk at high accuracy even in the conditions where the echo voice level is large compared with the transmission voice, and control the variable attenuator appropriately. As a result, it offers an advantage of being able to increase the quality of the transmission voice.

In addition, the echo canceler of the embodiment 1 includes: an adaptive filter for carrying out echo elimination by generating a dummy echo signal from a received signal and by subtracting the dummy echo signal from a transmission signal; a state deciding unit for making a double talk decision when the received signal and the transmission signal are in a speech burst, and when a difference between an amount of reduction in an echo removal level per prescribed time period and an amount of changes of a signal level of the received signal per prescribed time period exceeds a prescribed reference value, the echo removal level being represented as a level difference between the transmission signal and a residual signal passing through the echo elimination by the adaptive filter, or when a ratio between the amount of reduction and the amount of changes exceeds a prescribed reference value determined in accordance with the ratio between the amount of reduction and the amount of changes; a variable attenuator for adding a loss to the residual signal;

and an attenuator controller for controlling an amount of loss of the variable attenuator in accordance with a decision result of the state deciding unit. Thus, it also offers an advantage of being able to increase the quality of the transmission voice.

Furthermore, in the echo canceler of the embodiment 1, the state deciding unit includes: a receiving side speech burst/pause decision section for making a decision of a speech burst and speech pause of the received signal; a transmitting side speech burst/pause decision section for making a decision of a speech burst and speech pause of the transmission signal; an echo removal level evaluation section for making a decision as to whether the echo removal level is greater or less than a prescribed reference value in accordance with the transmission signal and the residual signal; an echo removal level fluctuation evaluation section for making a decision as to whether the amount of reduction of the echo removal level per prescribed time period is greater or less than a prescribed reference value in accordance with the amount of reduction of the echo removal level per prescribed time period and the amount of changes of the signal level of the received signal per prescribed time period; and a state decision section for making a decision of a speech pause of both transmitting side and receiving side when decision results of both of the receiving side speech burst/pause decision section and the transmitting side speech burst/pause decision section are a speech pause, for making a decision of transmitting side single talk when the decision result of the transmitting side speech burst/pause decision section is a speech burst and the decision result of the receiving side speech burst/pause decision section is a speech pause, for making a decision of receiving side single talk when the decision result of the transmitting side speech burst/pause decision section is a speech pause and the decision result of the receiving side speech burst/pause decision section is a speech burst, for making a decision of receiving side single talk when the decision results of both of the receiving side speech burst/pause decision section and the transmitting side speech burst/pause decision section are a speech burst, and when, as a decision result of the echo removal level evaluation section, the echo removal level is greater than a prescribed reference value, and when, as a decision result of the echo removal level fluctuation evaluation section, the amount of reduction of the echo removal level per prescribed time period is less than a prescribed reference value, and for making a decision of double talk when the decision results of both of the receiving side speech burst/pause decision section and the transmitting side speech burst/pause decision section are a speech burst, and when, as a decision result of the echo removal level evaluation section, the echo removal level is lower than the prescribed reference value, and when, as a decision result of the echo removal level fluctuation evaluation section, the amount of reduction of the echo removal level per prescribed time period is greater than the prescribed reference value. Thus, it further offers advantages of being able to detect at high accuracy the speech bursts and pauses at the receiving side and transmitting side, the receiving side single talk, or the transmitting side single talk.

Embodiment 2

The foregoing embodiment 1 detects the double talk section by detecting the start of the double talk from the fluctuation amount of the echo removal level through the adaptive filter, and by continuing the double talk decision for a prescribed time period from the start point of time. In contrast with this, the echo canceler of the present embodiment 2 detects the double talk section by detecting the start and end of the double talk from the fluctuation state of the echo removal level.

Since the configuration of the echo canceler of the embodiment 2 on the drawings is the same as that of the embodiment 1, the following description will be made with reference to FIGS. 1 and 2 of the embodiment 1.

The embodiment 2 differs from the embodiment 1 in the configurations of the echo removal level fluctuation evaluation section 204 and the state decision section 205 of the state deciding unit 2. More specifically, the echo removal level fluctuation evaluation section 204 is configured in such a manner as to decide not only the amount of reduction of the echo removal level per prescribed time period, but also the amount of increase per prescribed time period. In addition, the state decision section 205 is configured in such a manner as to decide not only the starting point of the double talk from the decision result of the sharp reduction in the echo removal level, which is made by the echo removal level fluctuation evaluation section 204, but also the ending point of the double talk from the decision result of the sharp increase in the echo removal level. Since the remaining configuration is the same as that of the embodiment 1, the description thereof is omitted here.

Next, the operation of the embodiment 2 will be described. Here, since the operation other than the evaluation of the fluctuation amount by the echo removal level fluctuation evaluation section 204 and the state decision by the state decision section 205 is the same as that of the embodiment 1, only different points from the operation of the embodiment 1 will be described with placing emphasis on them.

The echo removal level fluctuation evaluation section 204 receives ERLE(k) and calculates ERLE_DEF(k). In addition, it calculates LR_DEF(k) from LR(k). These calculation processings are the same as those of the embodiment 1. In addition, the echo removal level fluctuation evaluation section 204 makes a threshold decision as to ERLE_DEF(k) and LR_DEF(k). More specifically, as to a threshold THR_ERLE_DEF_L in the reducing direction, if $$ERLE\_DEF(k) \leq THR\_ERLE\_DEF\_L$$

$$|LR\_DEF(k)| \leq THR\_LR\_DEF \quad (8)$$

hold, it outputs the evaluation result flg_ST_ERLE(k)=−1 indicating that the echo removal level reduces sharply.

In addition, as to a threshold THR_ERLE_DEF_H in the increasing direction, if $$ERLE\_DEF(k) \geq THR\_ERLE\_DEF\_H$$

$$|LR\_DEF(k)| \leq THR\_LR\_DER \quad (9)$$

hold, it outputs the evaluation result flg_ST_ERLE(k)=1 indicating that the echo removal level increases rapidly. In the other cases, it outputs the evaluation result flg_ST_ERLE(k)=0 indicating that the echo removal level is stable.

In the state decision section 205, since the operations other than the operation of making a double talk decision are the same as those of the embodiment 1, their description will be omitted.

The state decision section 205 outputs flg(k)=2 (receiving side single talk) as long as flg_ST_ERLE(k)=0 in the case where flg_R(k)=1, flg_S(k)=1, and flg_ERLE(k)=1. However, when it receives flg_ST_ERLE(k)=−1 indicating the sharp reduction in the echo removal level, it outputs flg(k)=3 (double talk) as long as the state in which flg_R(k)=1, flg_S (k)=1, and flg_ERLE(k)=1 is maintained until it receives flg_ST_ERLE(k)=1 indicating the next sharp increase in the echo removal level. After receiving flg_ST_ERLE(k)=1, it outputs flg(k)=2 (receiving side single talk) again.

In addition, in the case where flg_R(k)=1, flg_S(k)=1, and flg_ERLE(k)=0, it outputs flg(k)=3.

Figure 4:
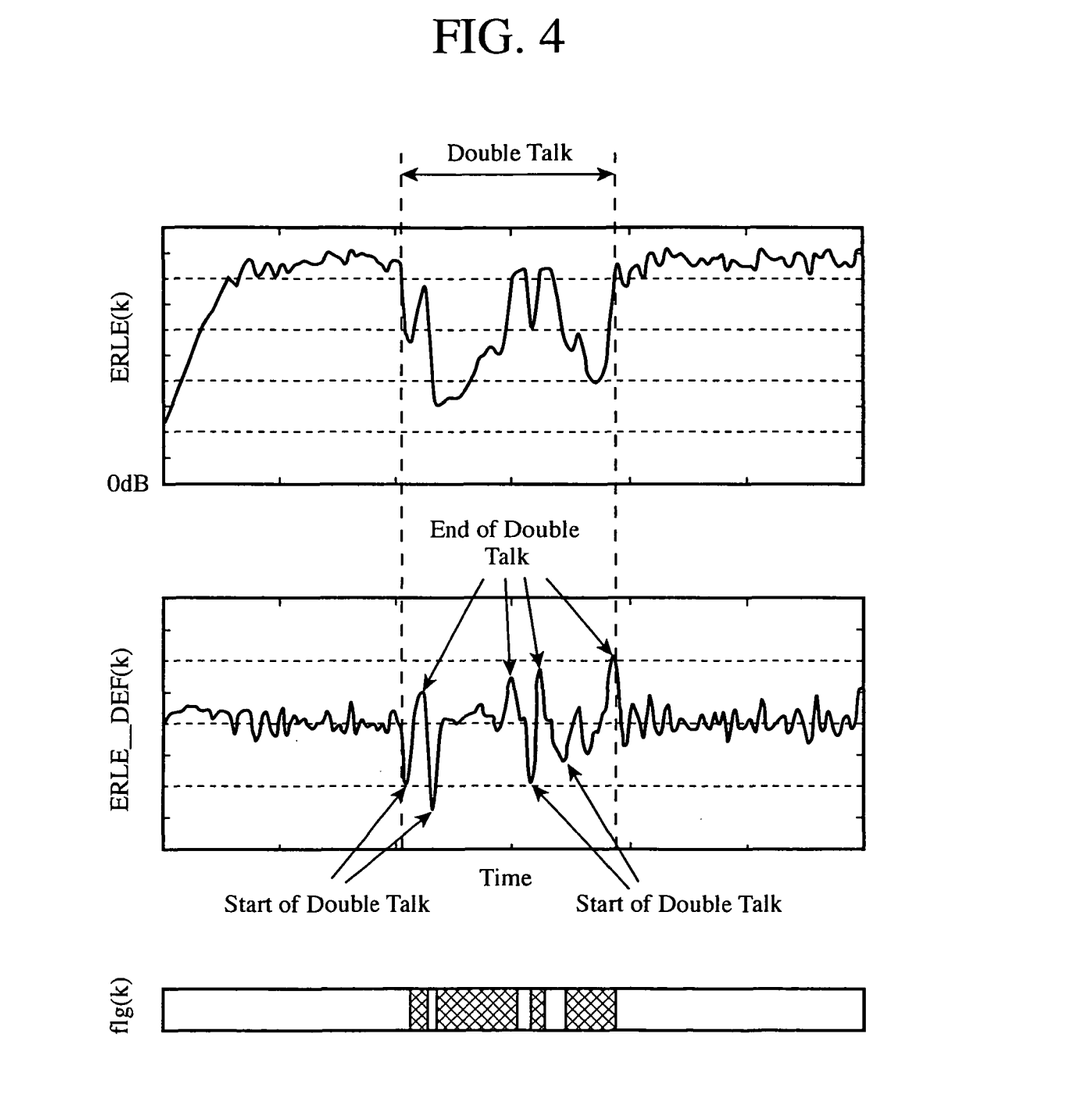
FIG. 4 is a diagram illustrating the state deciding operation in the echo canceler of an embodiment 2 in accordance with the present invention.

FIG. 4 illustrates an example of the output results of flg (k) in the embodiment 2.

As is clearly seen from FIG. 4, the embodiment 2 detects the sharp reduction and increase in the echo removal level, and makes a decision that the time intervals between them correspond to the double talk, thereby detecting the double talk accurately. As to flg(k) of FIG. 4, the shaded portions also indicate flg(k)=3 (double talk), and the remaining portions indicate flg(k)=2 (receiving side single talk).

As described above, according to the echo canceler of the embodiment 2, the state deciding unit makes, after the double talk decision, a decision that at a time when an amount of increase of the echo removal level per prescribed time period exceeds a predetermined threshold or at a time when the received signal or transmission signal changes to a speech pause state, an interval up to the time as a period of the double talk. As a result, it offers an advantage of being able to detect the double talk precisely.

Embodiment 3

The echo canceler of the embodiment 1 adopts the magnitude of the fluctuations in the echo removal level through the adaptive filter as one of the decision conditions in making a decision of the double talk state. On the other hand, the echo canceler of the embodiment 3 further adds to the decision conditions the cross-correlation between the transmitted and received signals.

Generally, the apparent reduction in the echo removal level through the adaptive filter can result from changes of the propagation path of the echo with respect to time. In such a case, monitoring of only the echo removal level and its fluctuation amount sometimes is not enough to distinguish between the start of the double talk and the changes of the echo propagation path. However, when the echo removal level fluctuates sharply, the double talk and the changes of the echo propagation path can be distinguished by checking the correlation between the received signal R(k) and the residual signal S'(k).

Figure 5:
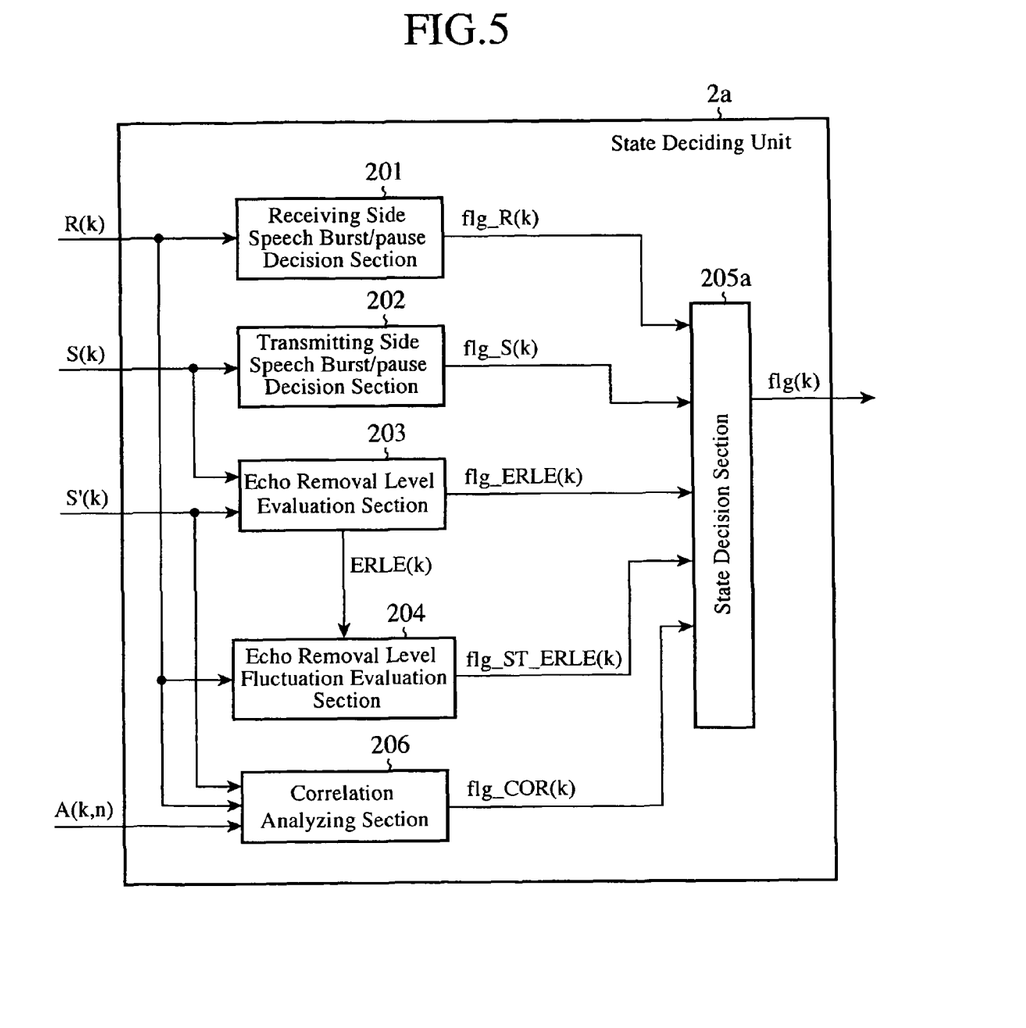
FIG. 5 is a block diagram showing a detailed configuration of the state deciding unit in the echo canceler of an embodiment 3 in accordance with the present invention.

FIG. 5 is a block diagram showing an internal configuration of the state deciding unit 2a in the embodiment 3.

The state deciding unit 2a of the embodiment 3 includes the receiving side speech burst/pause decision section 201, the transmitting side speech burst/pause decision section 202, the echo removal level evaluation section 203, the echo removal level fluctuation evaluation section 204, a state decision section 205a and a correlation analyzing section 206. Here, the correlation analyzing section 206 has functions of analyzing the cross-correlation between the transmission signal and the received signal, and of obtaining the maximum of the absolute value of the cross-correlation function. In addition, the state decision section 205a makes the state decision based on the decision results of the receiving side speech burst/pause decision section 201 to the correlation analyzing section 206. More specifically, the state decision section 205a is configured in such a manner as to make, regardless of the decision result of the echo removal level fluctuation evaluation section 204, a single talk decision of the receiving side if both the transmission signal and received signal are in a speech burst, and if the amount of reduction of the echo removal level per prescribed time period is less than a prescribed threshold, and if the maximum value of the absolute value of the cross-correlation function the correlation analyzing section 206 obtains is higher than a prescribed reference.

Since the remaining configuration is the same as that of the embodiment 1 or embodiment 2, the description thereof will be omitted here.

Next, the operation of the embodiment 3 will be described.

The correlation analyzing section 206 receives the received signal R (k) and the residual signal S'(k), and obtains the maximum value COR_MAX(k) of the cross-correlation function between R (k) and S'(k), first.

$$\text{COR\_MAX}(k) = \max_{\tau>0}\left(\left|\frac{\sum_{m=k-L+1}^{k} R(m-\tau)S'(m)}{\sum_{m=k-L+1}^{k} R(m)^2}\right|\right) \quad (10)$$

Figure 6:
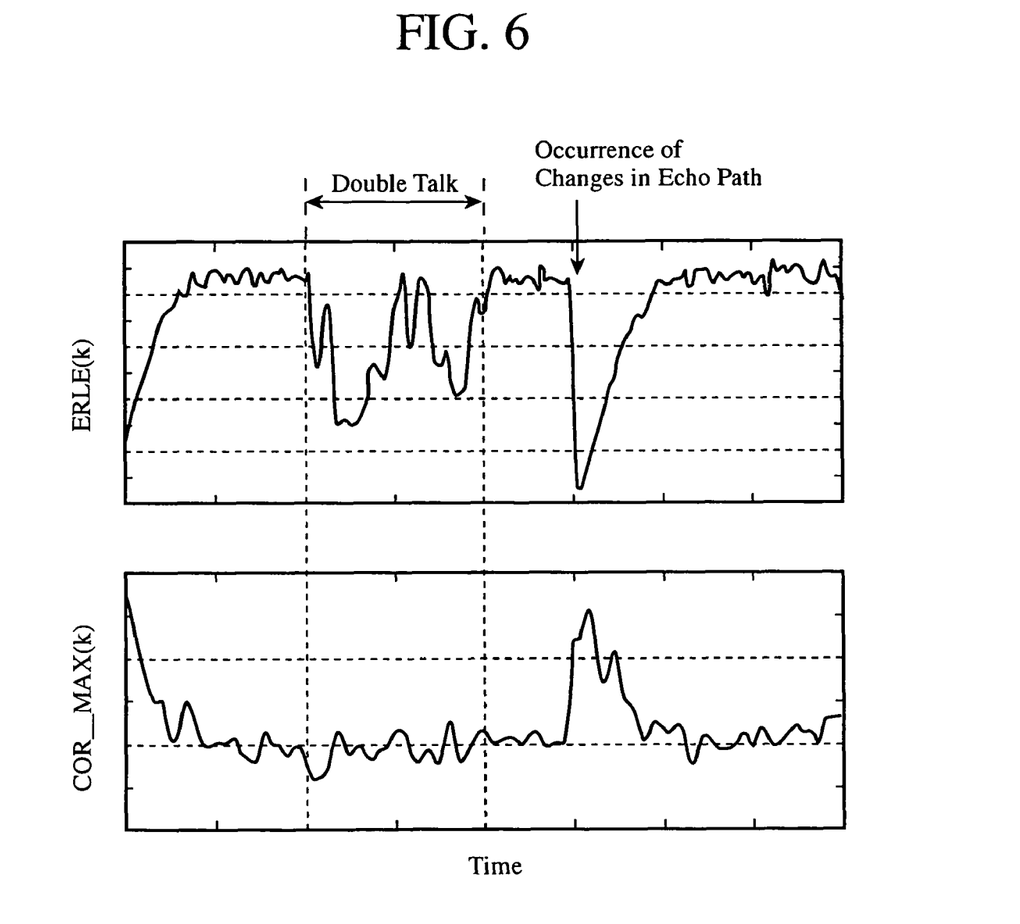
FIG. 6 is a diagram illustrating the state deciding operation in the echo canceler of the embodiment 3 in accordance with the present invention.

FIG. 6 is a diagram illustrating an example of the analysis result of the cross-correlation between the received signal and the transmission signal.

The state in FIG. 6 shows a case where the change of the echo propagation path occurs after the double talk. Although ERLE(k) becomes unstable at the instant either the double talk section or the echo propagation path occurs, CBR_MAX (k) is stable during the double talk section and exhibits a sharp start-up only at the instant the echo path change occurs. Thus, it is possible to distinguish between the double talk and the changes of the propagation path of the echo by detecting the start-up.

Consequently, the correlation analyzing section 206 outputs the decision result flg_COR(k)=1 which indicates that the correlation between the transmission signal and the received signal is high when $$\text{COR\_MAX}(k) \geq \text{THR\_COR} \quad (11)$$

holds in the comparison with a prescribed threshold THR_COR corresponding to the cross-correlation function. Otherwise, it outputs the decision result flg_COR(k)=0 which indicates that the correlation is low.

Incidentally, the calculation of the correlation function on an arithmetic processor takes a very long operation time. Thus, to reduce the operation time, it is possible to estimate a range of a time difference τ in which the absolute value of the correlation value becomes maximum in advance, and to calculate the correlation function by limiting to around the range to increase the efficiency.

To achieve this, a method is conceivable which utilizes an adaptive filter coefficient sequence A(k)=[a(0,k), a(1,k), . . . , a(M,k)]. Here, the relationship between R(k) and S(k) at the time of the single talk at the receiving side is given by the following expression.

$$S(k) = \sum_{m=0}^{\infty} h(k,m)R(k-m) + v(k)$$

where h(k,m) (m=0, 1, . . . ) is an impulse response of the echo propagation path represented in digital, and v(k) is external noise completely uncorrelated with R(k).

Then, the cross-correlation function $\phi_{R,S}(\tau,k)$ between R(k) and S(k) is given by $$\phi_{RS}(k, \tau) = E[R(k)S(k+\tau)] \quad (12)$$

$$= E\left[R(k)\left\{\sum_{m=0}^{\infty} h(m)R(k+\tau-m) + v(k)\right\}\right]$$

$$= \sum_{m=0}^{M} h(k,m)\phi_{RR}(\tau-m, k)$$

and becomes a convolution between the impulse response characteristic h(k,m) of the echo path and the autocorrelation function $\phi_{R\_R}(k,\tau)$ of R(k). As for $\phi_{R\_R}(k,\tau)$, it takes the maximum value at $\tau=0$ if R(k) is a common voice signal, and becomes a function convex upward that decreases as $|\tau|$ increases. As for h(k,m), h(k,m)=0 when m<0, and takes the maximum value at a particular m close to m=0 when m>0, and has a characteristic that decreases as m increases. This is because the reverberation of the echo decays with time. When A(k) simulates the propagation path of the echo sufficiently, |h(k,m)| takes the maximum value near m=l for n=l at which |a(k,n)| takes the maximum value.

Accordingly, when the term |a(n,k)| of A(k) is assumed to become maximum at n=l, it is highly probable that the absolute value $|\phi_{R\_S}(k,\tau)|$ of the correlation function between R(k) and S' (k) takes the maximum value in a restricted range $\tau=l\pm\alpha$.

Utilizing this fact makes it possible to find n=l at which the term |a(k,n)| of the filter coefficient sequence A(k) becomes maximum, to calculate the cross-correlation in the restricted range $\tau=l\pm\alpha$, and to assign the absolute value of the maximum as COR_MAX(k), where $\alpha$ is a constant determined freely. In this way, the amount of calculations required for obtaining COR_MAX (k) can be reduced.

In this case, l corresponds to the response time at the time when the echo circulates from the receiving channel to the transmitting channel at the maximum level. The response time l is nearly constant even if the change of the propagation path of the echo occurs because of the movement of a thing around l the microphone or speaker. This is because the speed of sound is sufficiently large as compared with the changes in the length of the propagation path of the echo, and hence only little changes appear in the response time.

In this case, the correlation analyzing section 206 receives the adaptive coefficients A(k) of the adaptive filter 1 as its input, and obtains n=l at which |a(k,n)| becomes maximum. Then, it obtains COR_MAX(k) by the following expression in the range $\tau=l+\alpha$.

$$\text{COR\_MAX}(k) = \max_{l+\alpha > \tau > l-\alpha} \left( \left| \frac{\sum_{m=k-L+1}^{k} R(m)S(m+\tau)}{\sum_{m=k-L+1}^{k} R(m)^2} \right| \right) \quad (12)$$

In the case where the transmitted and received signal is in a speech burst state, and a decision is made that the echo removal level is low and the fluctuations in the echo removal level are large, that is, when flg_R(k)=1, flg_S(k)=1, flg_ERLE(k)=0, and flg_ST_ERLE(k)=0, although the state decision section 205a makes a decision of the double talk if flg_COR(k)=0 just as the echo canceler of the embodiment 1 and outputs flg(k)=3, it makes a decision of the single talk at the receiving side if flg_COR(k)=1 and outputs flg(k)=2.

As described above, according to the echo canceler of the embodiment 3, the state deciding unit is configured in such a manner as to include a correlation analyzing section for analyzing a cross-correlation between the transmission signal and the received signal, and for obtaining a maximum of an absolute value of the cross-correlation function; and to make, regardless of the amount of reduction of the echo removal level per prescribed time period and regardless of the amount of changes of the received signal, a decision of the single talk of the receiving side when both the transmission signal and received signal are in a speech burst, and when the amount of reduction of the echo removal level per prescribed time period is less than a prescribed threshold, and when the maximum of the absolute value of the cross-correlation function value obtained by the correlation analyzing section is greater than a prescribed reference value. Thus, when the echo removal level reduces sharply, it can tell whether the reduction results from the double talk or from the change of the echo path, and control the variable attenuator appropriately. As a result, it offers an advantage of being able to suppress the echo effectively.

In addition, according to the echo canceler of the embodiment 3, the correlation analyzing section is configured in such a manner as to search for a coefficient at which an absolute value of a coefficient value becomes maximum in a coefficient sequence of the adaptive filter, and to carry out calculation of the cross-correlation function by calculating in a restricted range close to a time difference corresponding to order of the coefficient searched for in an adaptive filter coefficient sequence, and by searching for the maximum value of the absolute value. As a result, it offers an advantage of being able to reduce the calculation load of the arithmetic unit required for the echo processing.

INDUSTRIAL APPLICABILITY

As described above, the echo canceler in accordance with the present invention relates to the configuration for making a decision of the double talk on the basis of the amount of reduction of the echo removal level per prescribed time period, and is suitable for hands-free communication apparatuses, for example.

What is claimed is:
1. An echo canceler comprising:
an adaptive filter for carrying out echo elimination by generating a dummy echo signal from a received signal and by subtracting the dummy echo signal from a transmission signal;
a state deciding unit for detecting a double talk state when the received signal and the transmission signal are in a speech burst, when an amount of reduction in an echo removal level per prescribed time period exceeds a predetermined threshold, the echo removal level being represented as a level difference between the transmission signal and a residual signal passing through the echo elimination by said adaptive filter, and when an amount of changes of a signal level of the received signal per prescribed time period is less than a prescribed reference value;
a variable attenuator for adding a loss to the residual signal; and
an attenuator controller for controlling an amount of loss of said variable attenuator in accordance with a decision result of said state deciding unit.

2. An echo canceler comprising:
  an adaptive filter for carrying out echo elimination by generating a dummy echo signal from a received signal and by subtracting the dummy echo signal from a transmission signal;
  a state deciding unit for detecting a double talk state when the received signal and the transmission signal are in a speech burst, and when a difference between an amount of reduction in an echo removal level per prescribed time period and an amount of changes of a signal level of the received signal per prescribed time period exceeds a prescribed reference value, the echo removal level being represented as a level difference between the transmission signal and a residual signal passing through the echo elimination by said adaptive filter, or when a ratio between the amount of reduction and the amount of changes exceeds a prescribed reference value determined in accordance with the ratio between the amount of reduction and the amount of changes;
  a variable attenuator for adding a loss to the residual signal; and
  an attenuator controller for controlling an amount of loss of said variable attenuator in accordance with a decision result of said state deciding unit.

3. The echo canceler according to claim 1, wherein said state deciding unit comprises:
  a receiving side speech burst/pause decision section for making a decision of a speech burst and speech pause of the received signal;
  a transmitting side speech burst/pause decision section for making a decision of a speech burst and speech pause of the transmission signal;
  an echo removal level evaluation section for making a decision as to whether the echo removal level is greater or less than a prescribed reference value in accordance with the transmission signal and the residual signal;
  an echo removal level fluctuation evaluation section for making a decision as to whether the amount of reduction of the echo removal level per prescribed time period is greater or less than a prescribed reference value in accordance with the amount of reduction of the echo removal level per prescribed time period and the amount of changes of the signal level of the received signal per prescribed time period; and
  a state decision section for making a decision of a speech pause of both transmitting side and receiving side when decision results of both of said receiving side speech burst/pause decision section and said transmitting side speech burst/pause decision section are a speech pause, for making a decision of transmitting side single talk when the decision result of said transmitting side speech burst/pause decision section is a speech burst and the decision result of said receiving side speech burst/pause decision section is a speech pause, for making a decision of receiving side single talk when the decision result of said transmitting side speech burst/pause decision section is a speech pause and the decision result of said receiving side speech burst/pause decision section is a speech burst, for making a decision of receiving side single talk when the decision results of both of said receiving side speech burst/pause decision section and said transmitting side speech burst/pause decision section are a speech burst, and when, as a decision result of said echo removal level evaluation section, the echo removal level is greater than a prescribed reference value, and when, as a decision result of said echo removal level fluctuation evaluation section, the amount of reduction of the echo removal level per prescribed time period is less than a prescribed reference value, and for making a decision of double talk when the decision results of both of said receiving side speech burst/pause decision section and said transmitting side speech burst/pause decision section are a speech burst, and when, as a decision result of said echo removal level evaluation section, the echo removal level is lower than the prescribed reference value, and when, as a decision result of said echo removal level fluctuation evaluation section, the amount of reduction of the echo removal level per prescribed time period is greater than the prescribed reference value.

4. The echo canceler according to claim 1, wherein said state deciding unit
  makes, after the double talk decision, a decision that at a time when an amount of increase of the echo removal level per prescribed time period exceeds a predetermined threshold or at a time when the received signal or transmission signal changes to a speech pause state, an interval up to the time as a period of the double talk.

5. The echo canceler according to claim 1, wherein said state deciding unit:
  comprises a correlation analyzing section for analyzing a cross-correlation between the transmission signal and the received signal, and for obtaining a maximum of an absolute value of the cross-correlation function; and
  makes, regardless of the amount of reduction of the echo removal level per prescribed time period and regardless of the amount of changes of the received signal, a decision of the single talk of the receiving side when both the transmission signal and received signal are in a speech burst, and when the amount of reduction of the echo removal level per prescribed time period is less than a prescribed threshold, and when the maximum of the absolute value of the cross-correlation function value obtained by said correlation analyzing section is greater than a prescribed reference value.

6. The echo canceler according to claim 5, wherein said correlation analyzing section
  searches for a coefficient at which an absolute value of a coefficient value becomes maximum in a coefficient sequence of said adaptive filter, and carries out calculation of the cross-correlation function by calculating in a restricted range close to a time difference corresponding to order of the coefficient searched for in an adaptive filter coefficient sequence, and by searching for the maximum value of the absolute value.

* * * * *